United States Patent
Garney et al.

(10) Patent No.: US 7,512,082 B1
(45) Date of Patent: *Mar. 31, 2009

(54) TRACKING TRANSACTION STATUS FOR A BUS SYSTEM PROVIDING LEGACY BUS COMPATIBILITY

(75) Inventors: John I. Garney, Portland, OR (US); John S. Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,625

(22) Filed: Dec. 14, 1999

(51) Int. Cl.
*H04L 12/28* (2006.01)
(52) U.S. Cl. ...................... 370/257; 370/466
(58) Field of Classification Search ......... 370/464–471, 370/498, 507; 709/317; 710/315
See application file for complete search history.

(56) References Cited

U.S. PATENT DOCUMENTS

| | | | |
|---|---|---|---|
| 5,594,882 A * | 1/1997 | Bell | 711/212 |
| 5,617,418 A * | 4/1997 | Shirani et al. | 370/465 |
| 5,708,794 A * | 1/1998 | Parks et al. | 710/240 |
| 5,832,492 A * | 11/1998 | Wooten | 707/101 |
| 5,890,015 A * | 3/1999 | Garney et al. | 710/313 |
| 5,933,611 A * | 8/1999 | Shakkarwar | 710/100 |
| 5,987,106 A * | 11/1999 | Kitamura | 379/110.01 |
| 6,012,115 A * | 1/2000 | Chambers et al. | 710/105 |
| 6,034,950 A * | 3/2000 | Sauer et al. | 370/466 |
| 6,064,554 A * | 5/2000 | Kim | 361/64 |
| 6,067,589 A * | 5/2000 | Mamata | 710/63 |
| 6,067,591 A | 5/2000 | Howard et al. | |
| 6,145,039 A * | 11/2000 | Ajanovic et al. | 710/105 |
| 6,205,501 B1 * | 3/2001 | Brief et al. | 710/310 |
| 6,289,466 B1 * | 9/2001 | Bayramoglu et al. | 713/310 |
| 6,353,866 B1 * | 3/2002 | Fensore et al. | 710/104 |
| 6,389,029 B1 * | 5/2002 | McAlear | 370/402 |
| 6,389,501 B1 * | 5/2002 | Garney et al. | 710/310 |
| 6,585,431 B1 * | 7/2003 | Okamoto | 398/131 |
| 6,587,053 B1 * | 7/2003 | Lee | 340/825.72 |
| 6,600,739 B1 * | 7/2003 | Evans et al. | 370/362 |
| 6,792,495 B1 * | 9/2004 | Garney et al. | 710/305 |
| 6,813,251 B1 * | 11/2004 | Garney et al. | 370/257 |

OTHER PUBLICATIONS

Universal Serial Bus Specification Revision 2.0 (0.79), pp. 229-317, downloadable from the Internet, no date established at this time.*

* cited by examiner

*Primary Examiner*—Frank Duong
(74) *Attorney, Agent, or Firm*—Kenyon & Kenyon LLP

(57) ABSTRACT

A method of and apparatus for communicating between a host and an agent. According to an embodiment of the invention a method for communicating data between a host and an agent is described. The method includes performing a first transaction at a first time between a host and a hub. The method then includes performing a second transaction between the hub and an agent. The method then includes performing the first transaction at a second time between the host and the hub. The second transaction is based on the first transaction for the second time.

12 Claims, 10 Drawing Sheets

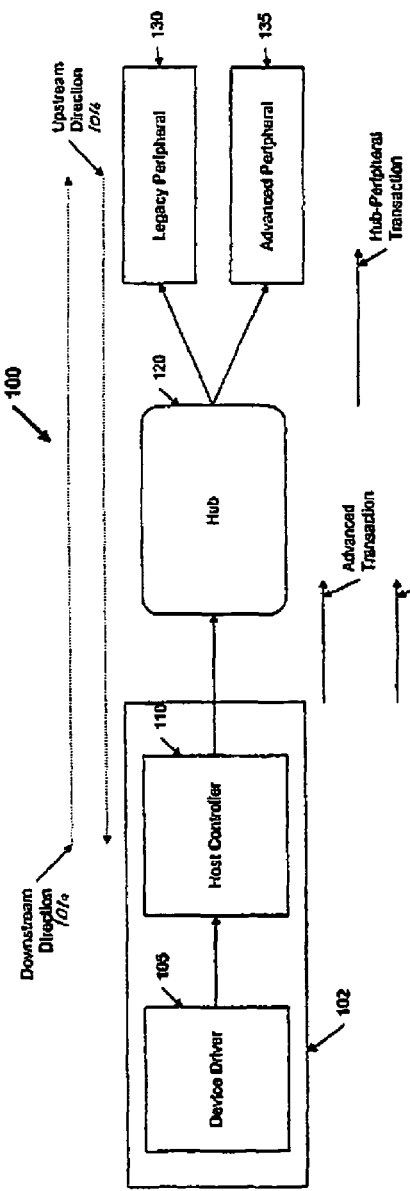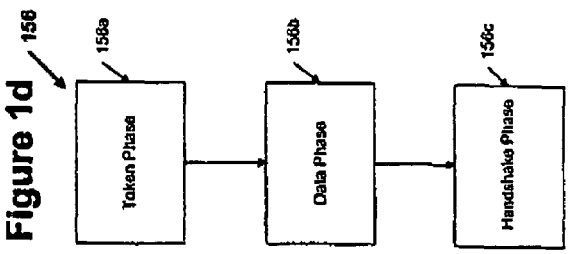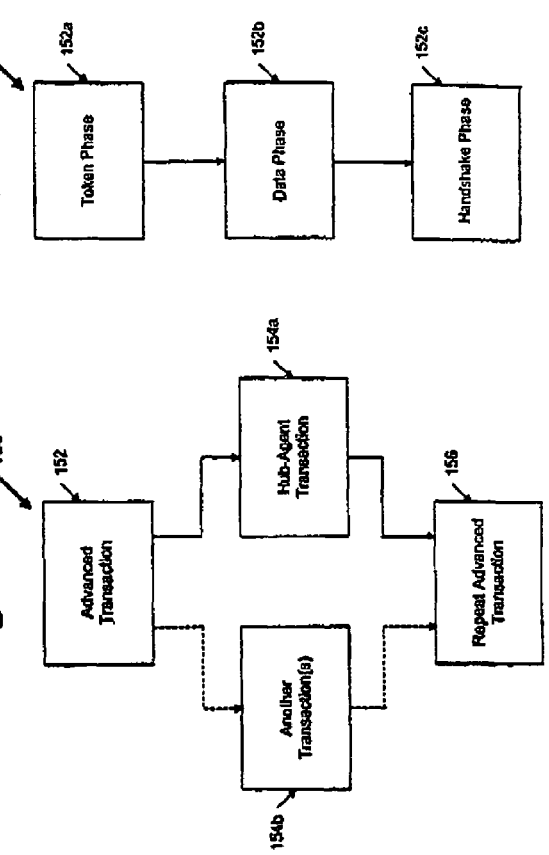

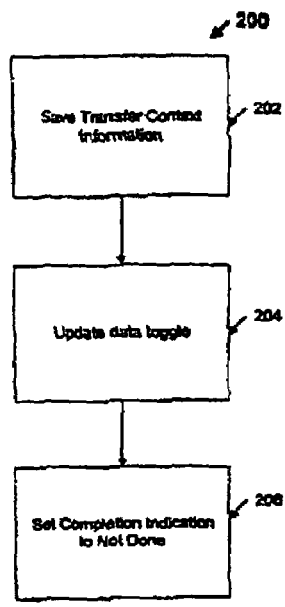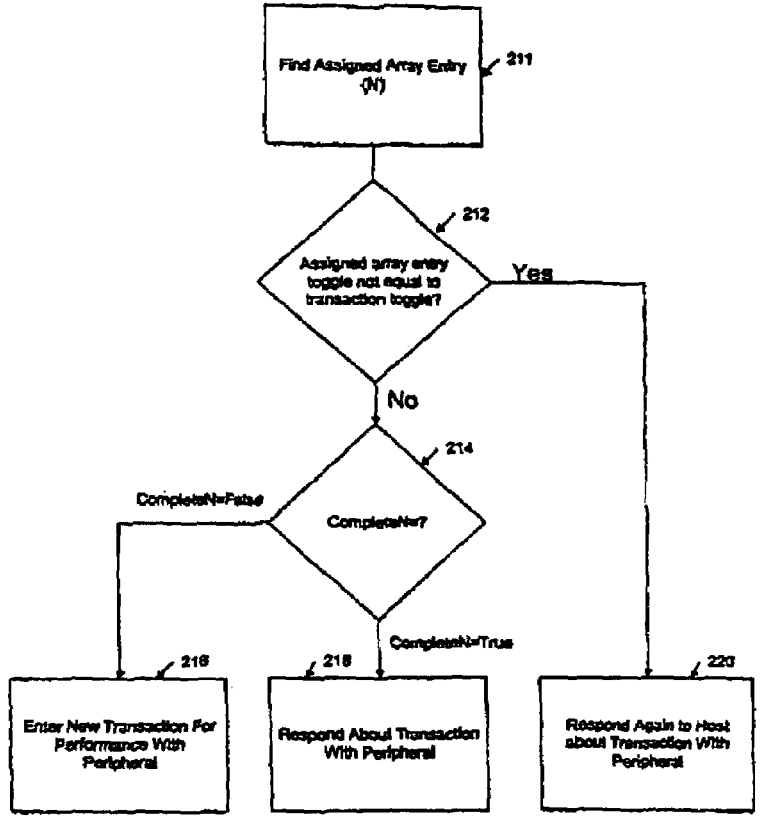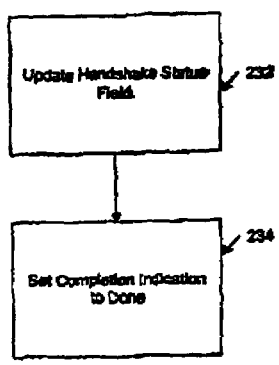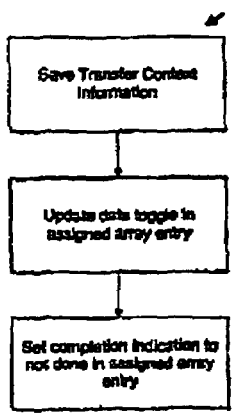

TRACKING TRANSACTION STATUS FOR A BUS SYSTEM PROVIDING LEGACY BUS COMPATIBILITY

FIELD OF THE INVENTION

The present invention pertains to the field of data communication in a digital system. More particularly, the present invention relates to methods or protocols for transferring information on a bus.

BACKGROUND OF THE INVENTION

A computer or similar device typically has a bus that connects peripherals to the computing system. Sometimes a hub or multiple hubs may be placed in between the peripheral and the computing system (host). A hub provides a fan-out capability by allowing multiple peripherals to be connected to the hub which is in turn connected to the host or a daisy-chain of hubs one of which is ultimately connected to the host. Some of the peripherals operate at a high data rate and some operate at a low data rate. Due to a variety of advances (e.g., computing power) in computers (hosts) and peripherals, the data rates at which some peripherals operate has increased significantly. The increase in data rates cannot be met using existing bus standards. For example, the relative difference between the highest data rate peripheral on a bus and the lowest data rate peripheral on a bus has increased to the point that existing solutions for allowing high data rate peripherals and low data rate peripherals to co-exist on the same bus are typically not very efficient. Additionally, existing solutions for allowing hosts to communicate with both advanced, high data rate devices and legacy, low data rate devices usually require the host and/or hub to be relatively complex and costly.

The increased demand for high data rates, as described above, cannot be met using existing buses nor using the bus architecture and protocols of existing buses. For example, the Universal Serial Bus (USB) Specification Revision 1.1, Sep. 23, 1998, (USB Standard) is limited to a full-speed data rate of 12 Mb/s (megabits per second) and a low-speed data rate of 1.5 Mb/s. Examples of relatively high data rate peripherals, include cameras, compact disc players, speakers, video cameras, microphones, video display devices, and scanners among other devices. Unfortunately, many of these devices have data rate requirements that exceed the data rates supported by USB. For example, a video display device can have a data rate in excess of 20 Mb/s.

Existing solutions for allowing high data rate peripherals and low data rate peripherals to co-exist on the same bus are typically not very efficient when used for buses whose ratio of the highest data rate supported on the bus to the lowest data rate supported on the bus is relatively large. Examples of low data rate peripherals, include mice and joy-sticks that need to co-exist along with the high data-rate peripherals. A mouse typically has a data rate significantly less than 0.1 Mb/s. When the ratio of the highest data rate to the lowest data rate is relatively small, solutions such as speed-shifting and non-multiplexed store-and-forward transactions are tolerable despite their relative inefficiency.

In USB, for example, speed-shifting refers to a host communicating at a low-speed with low data rate peripherals and alternatively at full-speed with high data rate devices (speed-shifting). Unfortunately, the amount of data actually transmitted over the bus (effective throughput) is less than that achievable by limiting the bus to full-speed transactions. Speed-shifting is also employed by "Firewire" or Institute of Electrical and Electronics Engineers (IEEE) Standard 1394 for a High Performance Serial Bus, 1995. Even though IEEE 1394 supports multiple data rates, up to 400 Mb/s, speed-shifting and the relatively high cost of Firewire make it an undesirable technology. The inefficiency of Firewire can be relatively severe when speed-shifting occurs in communicating between a 0.1 Mb/s mouse and a 20 Mb/s video display device.

Non-multiplexed store and forward transactions occur when a host (1) transmits at a high data rate a packet to a store-and-forward hub, (2) waits for the hub to forward at the low data rate the packet to the peripheral, (3) waits for the peripheral to respond at the low data rate to the hub, and (4) receives from the hub at a high data rate the peripheral's response to the packet. When the ratio of the highest data rate supported on the bus to the lowest data rate supported on the bus is relatively large, this co-existence solution may also result in a low effective throughput or bandwidth because of the time wasted in waiting for the hub to forward the packet at the low data rate and for the peripheral to respond at the low data rate.

Finally, existing solutions for allowing hosts to communicate with both modern, high data rate peripherals and legacy, low data rate peripherals have usually required the host and/or hub to be relatively complex and costly. Because the host and/or hub must communicate with both modern peripherals and legacy peripherals (i.e., provide backward compatibility), the host and/or hub have typically been required to support two separate protocols, two sets of transactions, and/or two data rates. Supporting multiple protocols and data rates has typically made the host and/or hub relatively complex and costly. Backward compatibility is often provided because there is a large base of legacy peripherals having a significant economic life left. The backward compatibility may allow a host and/or hub to communicate with legacy peripherals that use a different protocol and/or data rate than the modern peripherals.

As described above, existing buses are not capable of providing the high data rates required by modern peripherals. Additionally, existing solutions that allow high data rate peripherals and low data rate peripherals to co-exist on the same bus typically result in the bus having inefficient performance. Moreover, existing solutions for providing backward compatibility are relatively complex and costly. Consequently, it is desirable to provide the high data rates required by modern peripherals, efficient solutions allowing high data rate devices and low data rate devices to co-exist on the same bus, and backward compatibility for legacy devices in a relatively simple and economical manner.

SUMMARY OF THE INVENTION

According to an embodiment of the invention a method for communicating data between a host and an agent is described. The method includes performing a first transaction at a first time between a host and a hub. The method then includes performing a second transaction between the hub and an agent. The method then includes performing the first transaction at a second time between the host and the hub. The second transaction is based on the first transaction for the second time.

BRIEF DESCRIPTION OF THE DRAWINGS

The present invention is illustrated by way of example, and not limitation, in the figures of the accompanying drawings in which like references denote similar elements, and in which:

FIG. 1a illustrates a block diagram of a digital system using a protocol in accordance with the present invention;

FIGS. 1b, 1c and 1d each illustrates a process showing a method in accordance with this invention for communicating between a host controller and a hub;

FIG. 10a which illustrates a process for initializing state indicators in a hub for an embodiment in accordance with the present invention;

FIG. 10b which illustrates a process for tracking transactions for an embodiment in accordance with the present invention;

FIG. 10c illustrates a process for updating state indicators for an embodiment in accordance with the present invention; and FIG. 10d illustrates a flowchart of a process for initializing state indicators in a hub for another embodiment in accordance with the present invention.

DETAILED DESCRIPTION

Figure 2A:
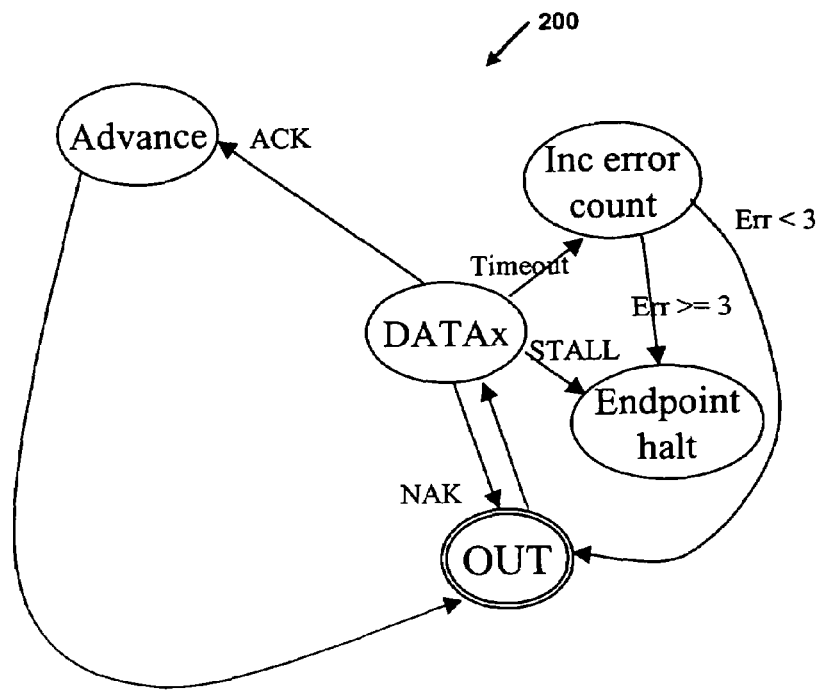
FIGS. 2a and 2b illustrate state machine diagrams for a host controller and a hub, respectively, performing a transfer in accordance with this invention.

A method and apparatus for communicating between a host and a peripheral (agent) is described, where the agent communicates at a different speed and/or protocol than the host. In the following description, for purposes of explanation, numerous specific details are set forth in order to provide a thorough understanding of the present invention. It will be evident, however, to one skilled in the art that the present invention may be practiced in a variety of bus systems, especially serial buses, without these specific details. In other instances well known operations, steps, functions and devices are not shown in order to avoid obscuring the invention.

Parts of the description will be presented using terminology commonly employed by those skilled in the art to convey the substance of their work to others skilled in the art, such as device or controller drivers, bus or host controllers, hubs, bus agents or agents, and so forth. Also, parts of the description will also be presented in terms of operations performed through the execution of programming instructions or initiating the functionality of some electrical component(s) or circuitry, using terms such as, performing, sending, processing, packaging, scheduling, transmitting, configuring, and so on. As well understood by those skilled in the art, these operations take the form of electrical or magnetic or optical signals capable of being stored, transferred, combined, and otherwise manipulated through electrical components.

Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "in an embodiment," "an alternative embodiment," or "an alternate embodiment" does not necessarily refer to the same embodiment, although it may.

FIG. 1a illustrates a block diagram of a bus using a protocol in accordance with the present invention. Bus 100 includes a system 102 having a host controller 110 which is coupled to hub 120 which is in turn coupled to legacy peripheral 130 and advanced peripheral 135. Host controller 110 has an associated device driver 105 that executes on system 102. Examples of peripherals (advanced and legacy) include cameras, compact disc players, speakers, microphones, video display devices, scanners, and joy-sticks and mice, among other devices. System 102 can include any digital system capable of digital communication, especially laptop computers, desktop computers, servers, set-top boxes, entertainment systems, and game machines. Consequently, this invention can be practiced with a variety of digital devices using digital communication.

Two arrows 101a and 101b are drawn in FIG. 1a to provide a frame of reference as to the direction of communication among the host, hub and agent. The direction from a peripheral to the hub and on to the host is referred to as the upstream direction or upstream (inbound). The direction from the host to the hub and on to the agent is referred to as the downstream direction or downstream (outbound).

As a legacy peripheral, peripheral 130 operates using a lower data rate (legacy peripheral data rate) than and/or a different protocol than that used by host 110. Peripheral 135 represents an advanced or modern peripheral. Consequently, peripheral 135 operates using the data rate of host 110 (host data rate) and/or protocol of host 110 (host protocol). Host 110 is optimized for communicating with peripheral 135 using the host data rate and host protocol. Since peripheral 130 communicates using a different data rate and/or protocol than that used by host 110, it is desirable to enhance the effective throughput on bus 100 by allowing host 110 to both (1) communicate at its higher data rate and (2) not have to wait for responses from peripheral 130 before engaging in another transaction. By not requiring host 110 to wait for responses from peripheral 130, bus 100 will provide increased responsiveness to peripheral 135 and other peripherals (not shown) that communicate at the host data rate and that are attached to hub 120 or other hubs. Additionally, it is desirable to allow the host and hub to communicate with peripheral 130 without making the host and hub relatively complex and costly. The present invention provides a method and apparatus for allowing a host to communicate relatively efficiently, simply, and economically with both a legacy peripheral, such as peripheral 130, and an advanced peripheral, such as peripheral 135.

While only two peripherals are shown coupled to hub 120, it should be apparent that additional peripherals (not shown) can be attached to hub 120 or to other hubs (not shown). These additional peripherals may communicate at the host data rate or the legacy peripheral data rate. Furthermore, while peripheral 130 is shown coupled to hub 120, it may be coupled to hub 120 through at least one conventional repeater type hub that operates at the advanced peripheral data rate. A conventional repeater type hub repeats signals it receives on its upstream side 6n its downstream ports, and vice versa. The conventional repeater type hub may in turn have one or more peripherals 130 attached to it.

Host controller driver 105 facilitates communications or transactions along bus 100 (e.g., on behalf of an application executing on system 102) by processing packets of information destined for peripherals 130 and 135 and scheduling the packets for transmission by controller 110. Host controller 110 and peripheral 130 have a master-slave relationship which means that the host initiates typically all data transactions between the host and a peripheral; i.e., the peripheral only responds to requests from the host but never initiates a transaction. Host controller 110 sends data to and receives data from peripherals 130 and 135 via hub 120. Hub 120 has store-and-forward buffers (not shown) that allow hub 120 to temporarily store downstream information received from host controller 110 and destined for peripheral 130, and to temporarily store upstream information received from peripheral 130 and destined for host controller 110.

FIG. 1b illustrates a process 150 showing a method in accordance with this invention for communicating with a peripheral having a lower data rate, than the data rate of a host controller. The peripheral may also have a different protocol than the host controller. Process 150 can be used to effect a variety of information transfers between host controller 110 and peripheral 130. For ease of understanding process 150 will only be described here with regards to an interrupt out transfer. However, process 150 can be used with other information transfers described herein, below. In an interrupt out transfer data is transferred from host controller 110 to peripheral 130 via hub 120. The interrupt out transfer, is defined according to an embodiment of this invention as a isochronous transfer type. However, it should not be concluded from this definition that any interrupt and/or out transfer need be isochronous.

At block 152 in process 150 an advanced transaction is performed. An advanced transaction herein refers to a transaction that host 110 would use with peripheral 135 directly or via a high data rate repeater (not shown) in hub 120. However, in block 152 the advanced transaction is performed with peripheral 130 via hub 120 which has a controller (not shown) that can communicate at the high data rate of controller 110. The advanced transaction communicates outbound data from host controller 110 to hub 120. Some of the outbound data communicated to hub 120 is temporarily buffered in hub 120.

At block 154a, hub 120 performs a hub-peripheral transaction with peripheral 130 based on some of the buffered outbound data. The hub-peripheral transaction is also referred to herein as a classic transaction. The relative timing of the classic transaction need not be described herein because one of ordinary skill in the art would recognize that this is an application or implementation detail for which there are many possibilities. The classic transaction may result in inbound information being buffered in hub 120. In an embodiment, the inbound information is handshake information that indicates what transpired during the classic transaction.

At block 154b, while hub 120 is performing the classic transaction, host 110 performs at least one transaction with one or more peripherals or hubs. For example, at block 154b, host 110 communicates with peripheral 135 while hub 120 is performing the classic transaction. At block 156, host 110 repeats the advanced transaction of block 152. The repeated advanced transaction communicates from hub 120 to host controller 110 inbound information that was buffered in hub 120 during the classic transaction of block 154a. The relative timing of the repeated transaction need not be described herein because one of ordinary skill in the art would recognize that this is an application or implementation detail for which there are many possibilities.

A benefit of the repeated transaction protocol (or repeat protocol) described above is that it allows controller 110 to initiate communication (block 152) with peripheral 130, engage in another function, or engage in another communication (block 154b) with another peripheral (low data rate or high data rate peripheral) while hub 120 communicates with peripheral 130, and then return to complete the communication (156) that was initiated earlier with low data rate peripheral 130. By communicating using repeated transactions, controller 110 communicates at a high data rate without speed-shifting and does not sit idle while waiting for hub 120 to communicate with peripheral 130. The time that would have been spent being idle is profitably used to communicate with another peripheral. In an alternative embodiment in accordance with the present invention, controller 110 may engage in speed-shifting with some peripherals while engaging in repeat protocol communication with other peripherals. Another benefit of the repeated protocol is that it allows the host to use the same transaction for both advanced peripherals, such as peripheral 135, and legacy peripherals, such as peripheral 130.

The repeat transaction protocol described above may be used to implement a variety of transfer types (e.g., read or write) for communicating data between controller 110 and peripheral 130. In an embodiment of this invention four transfer types (or transfer requests) are defined: bulk out/in, control out/in, interrupt out/in, or isochronous out/in. It should be apparent to one of ordinary skill in the art that the spirit and scope of this invention includes other embodiments with fewer, more or different transfer types. Each of the transfer types provides different levels of robustness, reliability, synchronization, asynchronous operation, error detection and correction of the communication flow, and other characteristics that should be apparent to one of ordinary skill in the art. For example, bulk out/in provides large asynchronous data transfers from controller 110 to peripheral 130 or in the opposite direction. Control out/in also provides asynchronous data transfer from controller 110 to peripheral 130 or in the opposite direction, but the data is typically control information used to control the operation of elements (e.g., a tape drive) in peripheral 130 or system 100. Interrupt provides a periodic data transfer from controller 110 to peripheral 130 or in the opposite direction. If the transfer is not successful, controller 110 may try again in an embodiment in accordance with this invention. Isochronous transfer provides a data transfer once every predetermined time interval. According to an embodiment of the present invention, the transfer may occur at any time during the time interval. If the transfer is not successful, controller 110 will not retry the transfer. In an alternative embodiment in accordance with the present invention, the isochronous transfer may provide for retries.

An advanced transaction may include a number of phases depending on the transfer type being implemented. A transaction may have up to three phases: token, data, and handshake. However, depending on the transfer being performed, some transactions may have fewer phases. In an embodiment of the present invention, bulk and control can use the same phases in each of their respective transactions. The phases for each of the transfer types described above are shown in Table 1, below. Presence of an "X" in a cell of the table indicates that the repeat or advanced repeat transaction for the transfer type has the phase indicated at the top of the column in which the cell resides. While in this embodiment the token and data phases are separate for each of the transfer types, in alternative embodiments the token and data phases may be combined. It should be apparent that in alternative embodiments transfer types may have fewer, more, or even different phases than those shown in Table 1 without departing from the scope and spirit of the present invention.

TABLE 1

| Transfer Type | Advanced Transaction | | | Repeat Advanced Transaction | | |
|---|---|---|---|---|---|---|
| | Token | Data | Handshake | Token | Data | Handshake |
| Bulk Control Out | X | X | X | X | X | X |
| Bulk Control In | X | X | X | X | X | X |
| Interrupt Out | X | X | X | X | X | X |
| Interrupt In | X | X | X | X | X | X |
| Isochronous Out | X | X | | X | X | |
| Isochronous In | X | X | | X | X | |

FIG. 1c illustrates in greater detail process 152 showing an advanced transaction for a interrupt out transfer in accordance with an embodiment of this invention. At step 152a a token packet including hub identification information, peripheral and endpoint identification information, transfer type, indicator for specifying direction of transfer (in or out), and data rate identification is sent from host controller 110 to hub 120. Hub identification information, and peripheral and endpoint identification information, and direction are together commonly referred to here as transaction addressing information. The peripheral identification information identifies the particular peripheral with which the host is attempting to communicate. The endpoint identification information identifies a particular portion in the peripheral with which the host is attempting to communicate. Examples of endpoints include: left speaker and right speaker of a speaker hub, or speaker and microphone of telephone handset. The transfer type in the transaction addressing information is not limited to the types described herein (e.g., bulk out, interrupt, isochronous, control), but can include other types known in the art without departing from the spirit and scope of this invention. Data rate identification specifies the data rate with which the classic transaction described in connection with block 154a above will be performed. For an embodiment in which the classic transaction is performed in accordance with the USB standard, data rate identification will specify either 12 Mb/s (full-speed) or 1.5 Mb/s (low-speed). At step 152b, a data packet is sent from host controller 110 to hub 120. At step 152c, a handshake is received by host controller 110 from hub 120. The handshake indicates whether the data was decoded properly by hub 120 or whether hub 120 wants to be tried later (e.g., hub 120 had full buffers and was not able to accept the data).

FIG. 1d illustrates in greater detail repeat advanced transaction 156 for an interrupt out transfer in accordance with an embodiment of this invention. At step 156a, the token packet described above in connection with block 152a is sent again from host 110 to hub 120. At block 156b, the data packet described above in connection with block 152b is sent again from host controller 110 to hub 120. At step 156c, a handshake is received by host controller 110 from hub 120, where the handshake can either (1) include handshake information received by hub 120 from peripheral 130 (classic handshake information) during the classic transaction described above in connection with FIG. 1b or 2 indicate that hub 120 does not yet have information based on the classic transaction to forward to host controller 110 (e.g., the classic transaction has not yet been completed). The classic handshake information indicates whether (1) peripheral 130 properly received data during the hub-peripheral transaction (ACK), (2) peripheral 130 indicated that it is not able to operate normally (STALL), or (3) peripheral 130 indicated that it wanted to be tried later (NAK). In an embodiment in accordance with the present invention, if a timeout occurs during the classic transaction, hub 120 will relay the occurrence of the timeout to host 110 by timing out during the handshake phase of the repeat advanced transaction. Timeout refers to the situation where the hub and agent are unable to complete the transaction within a predetermined time. While the handshake information and acknowledgements have been described above as specifying certain indicators, it should be apparent to one of ordinary skill in the art that these handshakes and other ones described herein may represent other indications. Additionally, acknowledgements and handshakes different from or additional to the ones described herein may be added in an alternative embodiment without departing from the spirit and scope of the invention.

While the above description has generally been presented in the context of peripheral 130 and hub 120 communicating at a lower data rate than the data rate between hub 120 and host controller 110, those skilled in the art will appreciate that the present invention may be practiced to bridge a host and an peripheral using different protocols.

Each of FIGS. 2a, 2b, 3a, 3b, 4a, 4b, 5a and 5b, illustrates a state machine diagram for performing a transfer using a host controller and a hub in accordance with this invention. Figures with an "a" as a suffix show the state machine diagram for a host controller; the state machine may be performed on host controller 110 described above in connection with FIG. 1a. Figures with a "b" as a suffix show the state machine diagram for a hub; the state machine may be performed on hub 120 described above in connection with FIG. 1a. The state machines illustrated in these figures show processes having multiple steps. It should be apparent that some of the steps may be divided into more numerous steps or combined into fewer steps without departing from the scope and spirit of this invention. The state machines are not described in great detail because their operation should be apparent to one of ordinary skill in the art. For ease of understanding, the processes performed by the state machines are not described separately. Since the processes performed by the state machines operate in tandem (i.e., each process has steps whose execution depends on the occurrence of events or steps in the other processes), the description of the processes are interleaved to facilitate understanding.

Figure 2B:
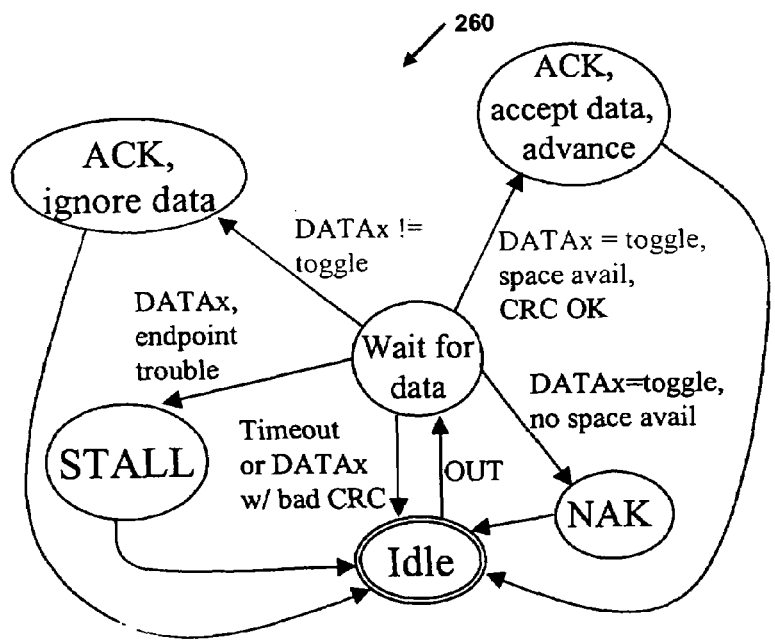

FIGS. 2a and 2b illustrate state machine diagrams for a host controller and a hub, respectively, performing a transfer in accordance with this invention, specifically an outbound bulk, control, or interrupt transfer. Process 200 and process 260 show the state machines for a host controller and a hub, respectively. Process 200 includes a token phase (OUT) and a data phase (DATAx), which may be repeated up to three times by the host controller when a timeout occurs while waiting for a handshake from the hub. In response to OUT and DATAx, process 260 will either propagate through states that will accept the data (ACK), respond to a host controller retry after a communication failure of a hub handshake to the host controller (ACK, don't accept data), request a host controller retry due to lack of space to hold the start transaction information (NAK), indicate that the hub was not able to function normally (STALL), or timeout up to three times.

Figure 3A:
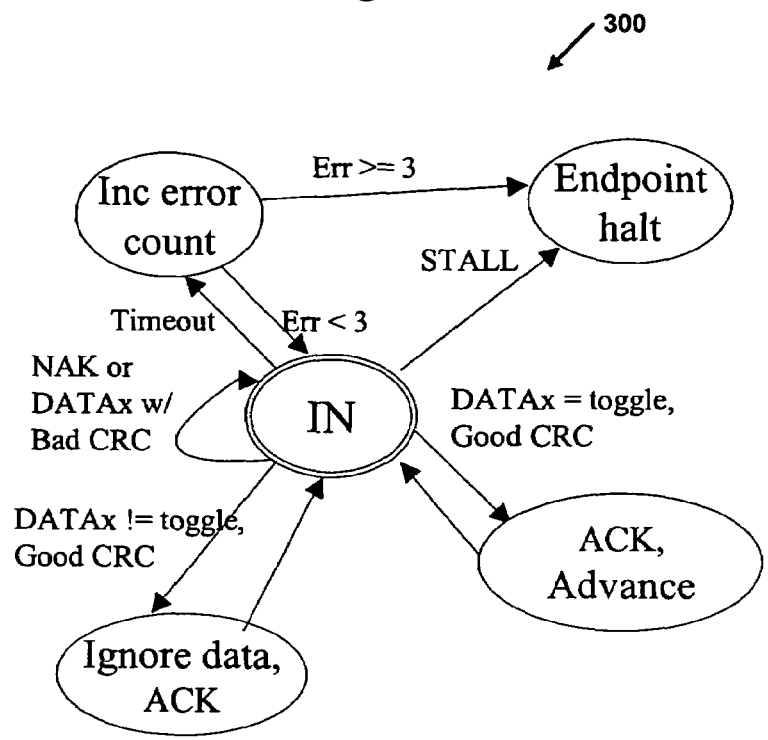
FIGS. 3a and 3b illustrate state machine diagrams for a host controller and a hub, respectively, performing another transfer in accordance with this invention.
Figure 3B:
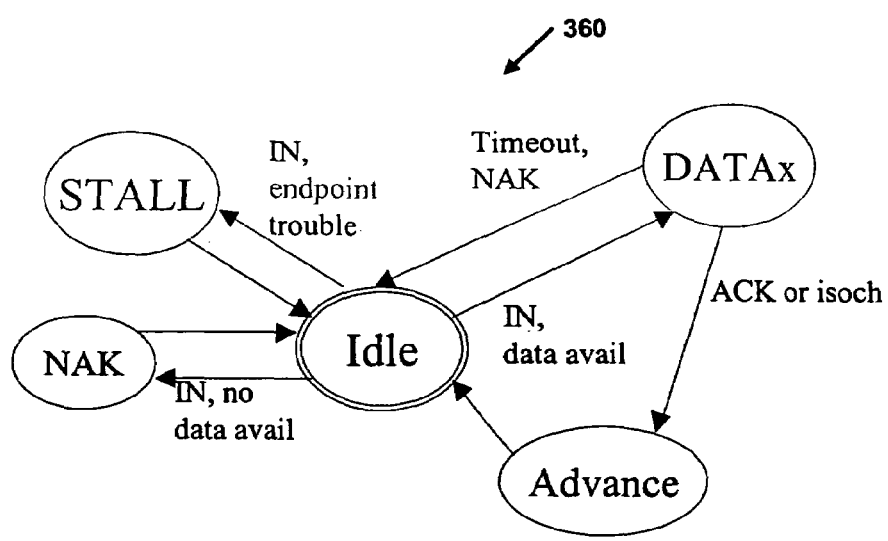

FIGS. 3a and 3b illustrate state machine diagrams for a host controller and a hub, respectively, performing another transfer in accordance with this invention, specifically an inbound bulk, control, or interrupt transfer. Process 300 and process 360 show the state machine for a host controller and a hub, respectively. Process 300 includes a token phase (IN), indicating either an inbound bulk, control, or interrupt transfer. In response to the IN, process 360 will indicate that a timeout occurred when the hub was communicating with the peripheral (NYET), or the hub didn't received the start transaction for this request and had no corresponding response information (STALL) or provide an indication (NAK, STALL) of what transpired during the transaction between the hub and the peripheral, or send data received from a peripheral to the host controller.

Figure 4A:
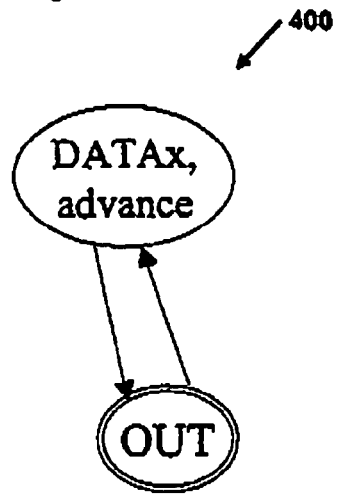
FIGS. 4a and 4b illustrate state machine diagrams for a host controller and a hub, respectively, performing another transfer in accordance with this invention.
Figure 4B:
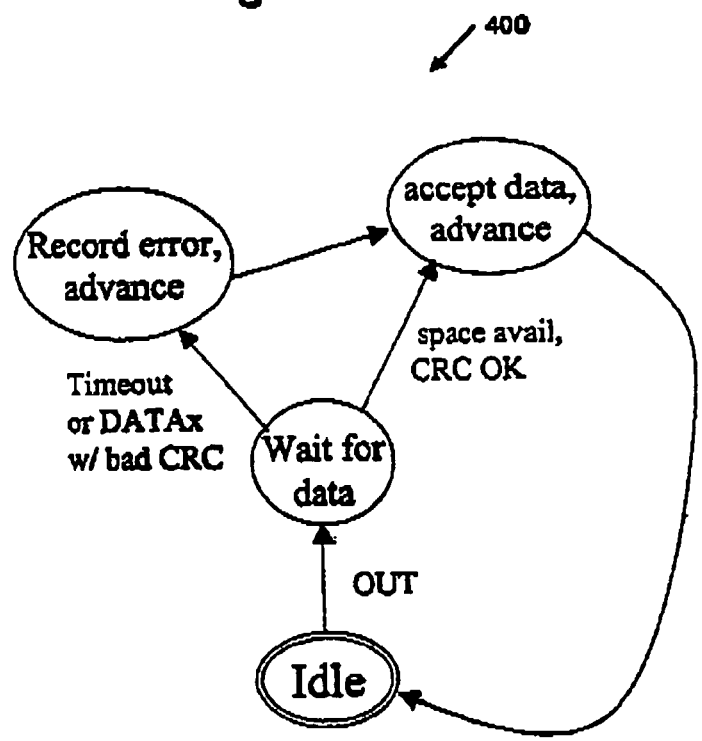

FIGS. 4*a* and 4*b* illustrate state machine diagrams for a host controller and a hub, respectively, performing another transfer in accordance with this invention, specifically an outbound isochronous transfer. Process 400 and process 460 show the state machines for a host controller and a hub, respectively. Process 400 includes a token phase (OUT), which indicates that the transfer is an outbound ischronous transfer, followed by a data phase (DATAx) which sends data from the host controller to the hub. In response to OUT and DATAx, process 460 will either propagate to an error state, indicating hub could not accept data.

Figure 5A:
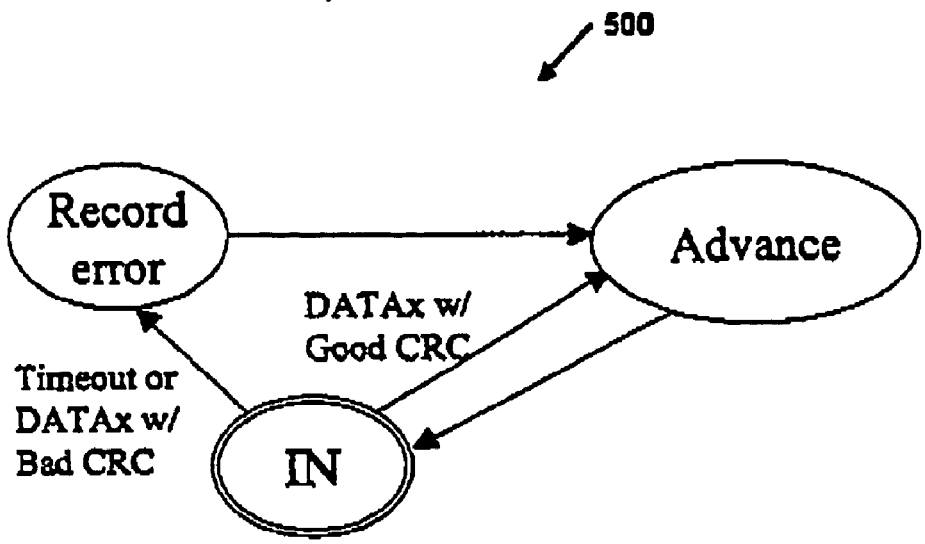
FIGS. 5a and 5b illustrate state machine diagrams for a host controller and a hub, respectively, performing another transfer in accordance with this invention.
Figure 5B:
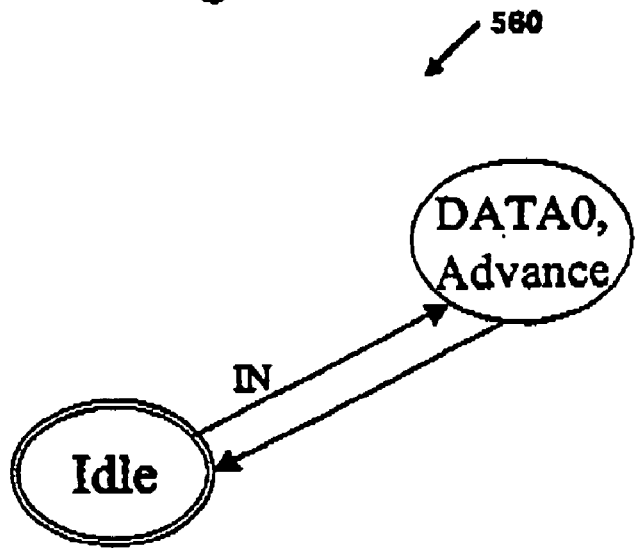

FIGS. 5*a* and 5*b* illustrate state machine diagrams for a host controller and a hub, respectively, performing another transfer in accordance with this invention, specifically an inbound isochronous transfer. Process 500 and process 560 show the state machine for a host controller and a hub, respectively. Process 500 includes a token phase (IN) which is not repeated. In response to IN, process 560 will return data to the host controller.

It is useful at this point to summarize the above description of the repeated transaction protocol before describing the remaining apparatus and methods of the present invention. The protocol described above allows a host controller to transfer data to or receive data from a legacy peripheral via a hub. The protocol allows the host controller to engage in an advanced transaction (first transaction at a first time) in which a transfer request is communicated to the hub. The hub is to perform the transfer request during a classic transaction with the legacy peripheral. After the host controller performs the first transaction, it may engage in an intermediate transaction (second transaction) with the same hub, or another hub or peripheral (legacy or advanced), without waiting for the hub and the legacy peripheral to perform the transfer request (i.e., engage in the transfer of data to or from the legacy peripheral). The intermediate transaction may include a transfer request for the legacy peripheral, another peripheral on the same hub as the legacy peripheral, or another peripheral on yet another hub. At some later time (a second time) after the first transaction at a first time, the host controller performs a repeat advanced transaction (or first transaction at a second time) to get the result (e.g., data or handshake sent from the peripheral to the hub) of the transfer performed between the hub and the legacy peripheral during the classic transaction. By allowing the host controller the capacity to engage in an intermediate transaction, instead of waiting for the hub to perform the transfer request with the legacy peripheral, the effective throughput of a bus using a protocol in accordance with this invention can be significantly greater than buses which involve speed-shifting or which require the host controller to wait for the hub to perform the transfer with the peripheral before initiating another transfer. Moreover, by allowing the host controller to use the same transaction for both legacy peripherals and advanced peripherals, the hub and host can be made relatively simple and economical.

While the above description defines the sequence of transactions involved in communicating data and/or handshake information between a host controller and a legacy peripheral, it does not describe how host controller 110 schedules the advanced and repeat advanced transactions. An advanced transaction and its corresponding repeated advanced transaction are collectively referred to herein as repeat transactions. Scheduling of transactions is important because peripherals typically require data to be sent to or received from the host controller on a periodic (e.g., isochronous or interrupt) or asynchronous (e.g., bulk or control) basis. Additionally, the above description does not explicitly describe how hub 120 tracks transactions (i.e., differentiates between repeat transactions) so as to use the advanced transaction to perform a classic transaction with legacy peripheral 130 and the latter the repeat advanced transaction to return data or handshake information to host 110. The issues not addressed by the above description of the repeat transaction protocol, namely the scheduling of transactions and the tracking of the transactions by hub 120, are addressed by the following descriptions of methods and apparatus in accordance with the present invention. The present invention includes a method and apparatus for scheduling transfers of data to and from a peripheral and a method and apparatus for tracking transactions at a hub. The method and apparatus for scheduling transfers of data is described first and then the method and apparatus for tracking transactions is described second.

Referring again to FIG. 1, the process of scheduling transactions (or transfers of data) first begins when system 102 performs configuration for legacy peripherals attached to the bus of the system. Configuration can occur upon system initialization or boot-up or when an peripheral is attached to the bus after initialization. The scheduling of data transfers depends on the transfer type associated with an peripheral (or an endpoint of an peripheral) and the amount of data involved in the transfer. The manner in which peripherals having associated periodic transfers, such as isochronous and interrupt, are handled is described first, below, and then the manner in which peripherals having associated asynchronous transfers, such as bulk and control, are handled is described next.

During the process of configuration, each endpoint of each peripheral informs the system of the endpoint's associated period, maximum data payload size and transfer type (e.g., isochronous in/out, interrupt, bulk, control). The manner in and device by which each peripheral informs system 102 is well understood by those of ordinary skill in the art and need not be described here. The endpoint's period is the regular interval with which a transfer to or from the endpoint must occur. The maximum data payload size is the largest amount of data that a transfer to or from a peripheral will entail. The system relays the data payload size and the transfer type to the host controller. The manner in which the system relays the size and transfer type to the host controller is well understood by those of ordinary skill in the art and need not be described here. The host controller uses the aforementioned two pieces of information associated with each legacy endpoint to generate frame template(s) for the periodic transfers of the endpoints. In an alternate embodiment, a software driver such as host controller driver 105 or even a hardware driver can generate the frame template(s) and perform the scheduling operations described below.

A frame template is a unique group of periodic transactions that are authorized to occur between the hub and host during a specific time interval on the bus. Communication activity on a bus is composed of a small set of repeating frame templates or groups of transactions. A frame template describes a group of transactions that will occur during a frame and that will repeat together a certain number of frames later. A frame is the fundamental continuously recurring time interval by which activity and time on the bus is measured. In an embodiment, communication between hub 120 and legacy peripheral 130 is characterized by a frame having a one millisecond (1 ms) time period, and communication between host 110 and hub 120 is characterized by a microframe having a 0.125 ms time period. Each frame has one frame template with which it is associated. Until a frame template repeats a certain number of frames later, intervening frames are populated by other frame templates. The number of frame templates is equivalent to the number of distinct periods that the periodic transactions have. For example, if bus 100 only has eight legacy endpoints requiring eight periodic transactions with only four distinct periods there will only be four frame templates.

When the first legacy endpoint being configured requests that a periodic transaction occur with a specified period, the advanced periodic transaction will be placed in a first frame template which repeats in no more than half the specified period of the periodic transaction. For example, if the periodic transaction is supposed to achieve a data transfer in between the hub and the host once every four frames, an advanced periodic transaction will be placed in a frame template that reoccurs at least every 2 frames. In other words, in every two consecutive frames in the stream of frames between host 110 and hub 120 the advanced periodic transaction will be performed at least once. The first time the advanced periodic transaction is performed host 110 informs hub 120 of the need to perform a data transfer (e.g., receive data from or send data to the legacy endpoint). The second time the advanced periodic transaction is performed hub 120 returns either data or handshake information to host 110, depending on the type of transaction (in or out) performed.

As other endpoints get configured, an endpoint that has a transaction with a period equal to the first legacy endpoint will have its associated advanced periodic transaction placed in the same frame template as the first legacy endpoint. Each time a new legacy endpoint requests a periodic transaction to be performed with a period that has not already been encountered, a new frame template is generated, and the advanced periodic transaction of the new legacy endpoint will be placed in the new frame template.

Figure 6:
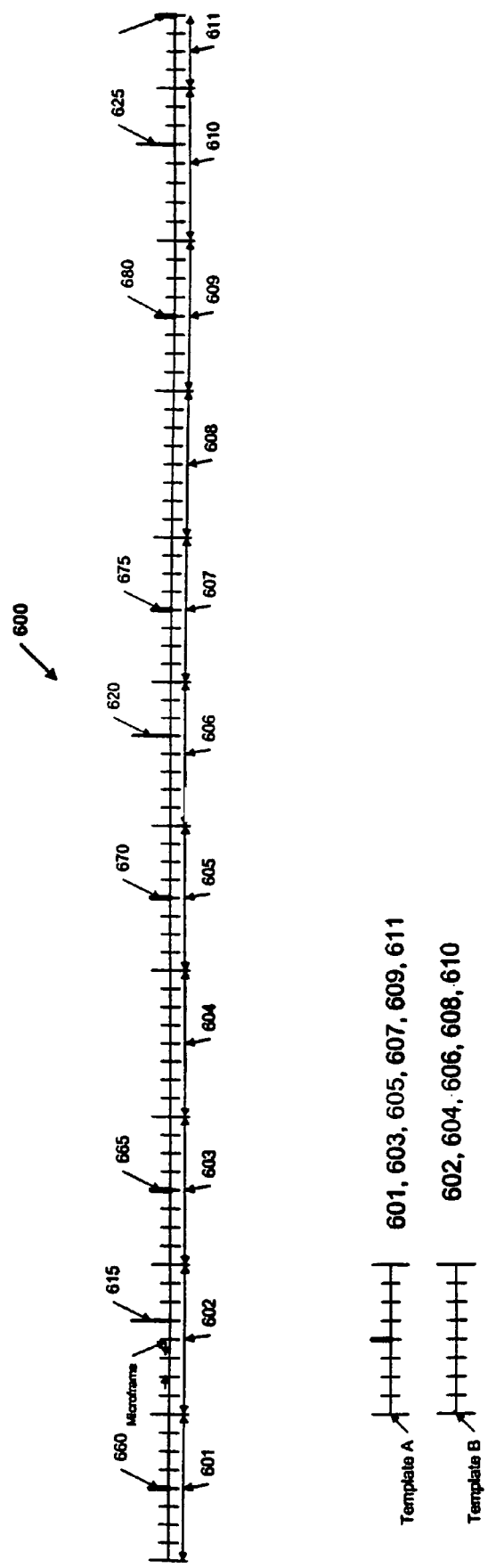
FIG. 6 illustrates a diagram showing transactions on a bus for one embodiment of the present invention.

FIG. 6 illustrates a diagram 600 showing transactions on a bus in accordance with an embodiment of the present invention. Diagram 600 illustrates a brief sample of activity on bus 100 due to a legacy endpoint which requires a data transfer every four frames. Diagram 600 includes classic transactions 615, 620 and 625 each of which is spaced four frames apart because the legacy endpoint requires a data transfer every four frames. Classic transactions 615, 620, and 625 take place between hub 120 and legacy peripheral 130. During the classic transactions, data transfers occur between hub 120 and legacy peripheral 130. Of the frames 601 to 611 shown in FIG. 6, transaction 615 occurs in frame 602. Transaction 620 occurs in frame 606, and transaction 625 occurs in frame 610. Diagram 600 also includes advanced transactions 660, 665, 670, 675, 680, and 685 occur between host 110 and hub 120. As stated above, bus 100 is a master-slave bus. Consequently, classic transactions 615, 620, and 625 cannot happen without host 110 initiation. As described above, host 110 performs two transactions for each classic transaction. Host 110 performs advanced transaction 660 with hub 120 in which data and/or a transfer request is sent to hub 120, causing classic transaction 615 between hub 120 and legacy peripheral 130. Host 110 later performs advanced transaction 665 to retrieve either the data transferred between hub 120 and legacy peripheral 130 or to retrieve handshake information.

The advanced transactions between host 110 and hub 120 can be scheduled by driver 105 using two frame templates: template A and template B. Since advanced transactions 660, 665, 670, 675, 680, and 685 are identical, they can be expressed by a single advanced transaction that is placed in frame template A that repeats with a period that is no more than half the period of the data transfer (or classic transaction) that occurs between hub 120 and legacy peripheral 130. Frame template B is empty and also repeats with a period that is no more than half the period of the data transfer that occurs between hub 120 and legacy peripheral 130.

While in the above description a periodic transaction occurs with a period no more than half as long as the period of its associated data transfer, in an alternate embodiment in accordance with the present invention the repeated transactions that cause the classic transaction can have the same period as the period of the data transfers required by the legacy peripheral's endpoint. While in the above description bus 100 was described in the context of one template containing transactions for one legacy endpoint and an empty template, it should be apparent that bus 100 may have one or more templates each containing transactions for multiple legacy endpoints and no empty template. While in the above description a template has a period greater than one frame, for an alternative embodiment a template may have a period less than one frame.

Figure 7:
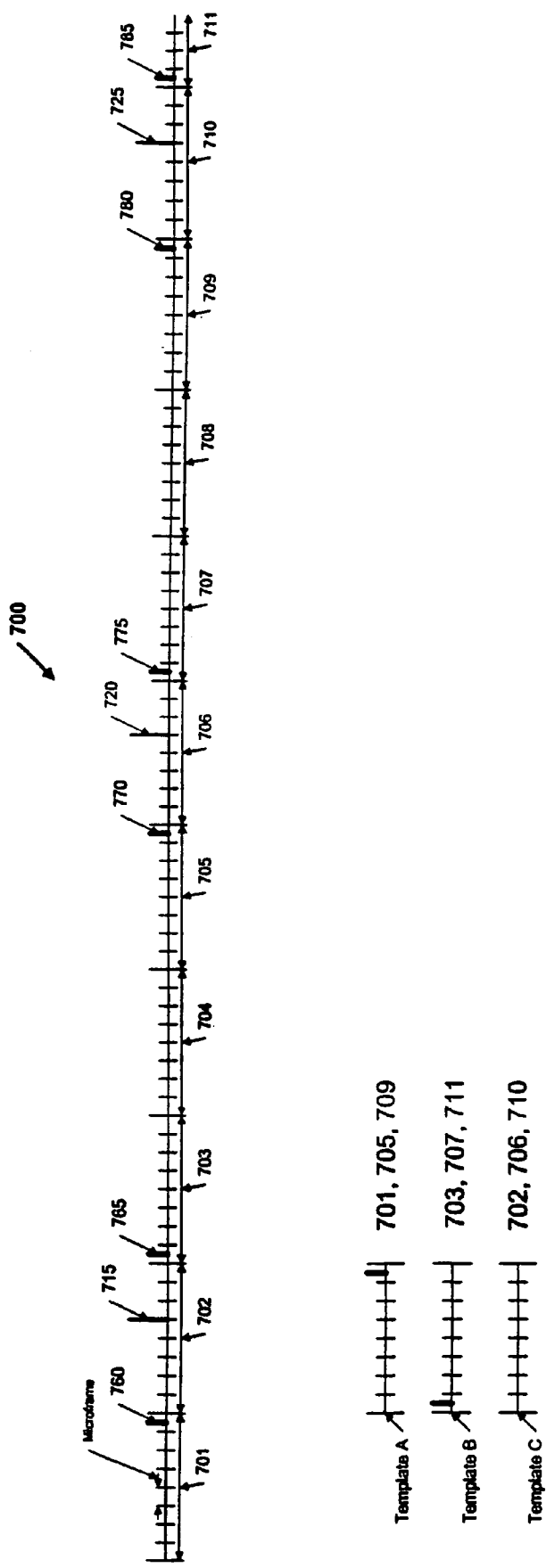
FIG. 7 illustrates a diagram showing transactions on a bus for another embodiment of the present invention.

FIG. 7 illustrates a diagram showing transactions on a bus in an embodiment of the present invention. Diagram 700 illustrates a brief sample of activity on bus 100 due to a legacy endpoint which requires a data transfer every four frames. Diagram 700 includes classic transactions 715, 720 and 725 each of which is spaced four frames apart because the legacy endpoint requires a data transfer every four frames. Classic transactions 715, 720, and 725 take place between hub 120 and legacy peripheral 130. Of the frames 701 to 711 shown in FIG. 7, transaction 715 occurs in frame 702. Transaction 720 occurs in frame 706, and transaction 725 occurs in frame 710. During the classic transactions, data transfers occur between hub 120 and legacy peripheral 130. Diagram 700 also includes advanced transactions 760, 765, 770, 775, 780, and 785. Advanced transactions 760, 765, 770, 775, 780, and 785 occur between host 110 and hub 120. As stated above, bus 100 is a master-slave bus. Consequently, classic transactions 715, 720, and 725 cannot happen without host 110 initiation. As described above, host 110 performs two transactions for each classic transaction. Host 110 performs advanced transaction 760 with hub 120 in which data and/or a transfer request is sent to hub 120, causing classic transaction 715 between hub 120 and legacy peripheral 130. Host 110 later performs advanced transaction 765 to retrieve either the data transferred between hub 120 and legacy peripheral 130 or to retrieve handshake information.

Transaction 760 is scheduled to run one microframe before the frame in which classic transaction 715 must occur. Host 110 later performs transaction 765 to retrieve either the data transferred between hub 120 and legacy peripheral 130 or to retrieve handshake information. Transaction 765 is scheduled to run one microframe after the frame in which classic transaction 705 must occur. Transactions 760 and 765 are identical but they occur at different microframes in their respective frames. However, transactions 760, 770, and 780 are identical and occur at the same microframe in their respective frames. Similarly, transactions 765, 775, and 785 are identical and occur at the same microframe in their respective frames.

Advanced transactions 760, 765, 770, 775, 780, and 785 between host 110 and hub 120 can be scheduled by driver 105 using three frame templates: template A, template B, and template C. Since advanced transactions 760, 770, 780 are identical, they can be expressed by a single advanced transaction that is placed in frame template A that repeats with a period that is equivalent to the period of the data transfer (or classic transaction) that occurs between hub 120 and legacy peripheral 130. In other words, frame template A repeats every four frames starting with frame 701. Similarly, since advanced transactions 765, 775, and 785 are identical, they can be expressed by a single advanced transaction that is place in frame template B that repeats every four frames starting with frame 703. Frame template C is empty and also repeats every four frames starting with frames 702 and 704.

While in the above description classic transactions occur every four frames, it should be apparent that this is an implementation detail and that the present invention encompasses classic transactions having other periods. For example, for one embodiment a template containing a transaction may have a period that is greater than the duration of one frame. Additionally, for an alternative embodiment, a template containing a transaction may have a period that is less than the duration of one frame. While the above description was presented in the context of a periodic transaction or data transfer for a single endpoint, it should be apparent that the present invention encompasses a host that schedules periodic transactions for more than one endpoint.

While the above description has generally been presented in the context of periodic transactions, the invention is not limited to periodic transaction but also includes asynchronous transfers such as the bulk and control transfers described above. According to an embodiment of the present invention, ninety percent of a frame between the hub and legacy peripherals is set aside for periodic transfers. When an application commands driver 105 to issue an asynchronous transaction such as bulk or control transaction, driver 105 requests controller 110 to issue the asynchronous transaction when there is time available during a frame between host 110 and hub 120. Hub 120 engages in the asynchronous transaction with host 110, and if there is space in hub 120 to store a hub-peripheral asynchronous transaction record, a hub-peripheral asynchronous transaction record is stored in a memory (not shown) in hub 120. Hub 120 has a controller (not shown) that retrieves the hub-peripheral asynchronous transaction record and performs a hub-peripheral asynchronous transaction with peripheral 130 if there are no more periodic transactions to perform during a frame between hub 120 and peripheral 130 and there is time remaining during the frame. Once hub 120 has stored a hub-peripheral asynchronous transaction, controller 110 repeats at a later time the advanced asynchronous transaction to retrieve from the hub the results of the hub-peripheral asynchronous transaction on the classic bus.

A method and apparatus for tracking advanced transactions and repeat advanced transactions in a hub in accordance with this invention will now be described. Since both the advanced transaction and the repeat advanced transaction are identical, the hub needs to identify whether the transaction in which it is engaged is either an advanced transaction or repeat advanced transaction in order for it to react properly.

In the case of an advanced transaction, the hub may need to store information received during the advanced transaction so that it can use the information during the classic transaction. In the case of a repeat advanced transaction, the hub may need to forward to the host information received during the classic transaction.

Figure 8:
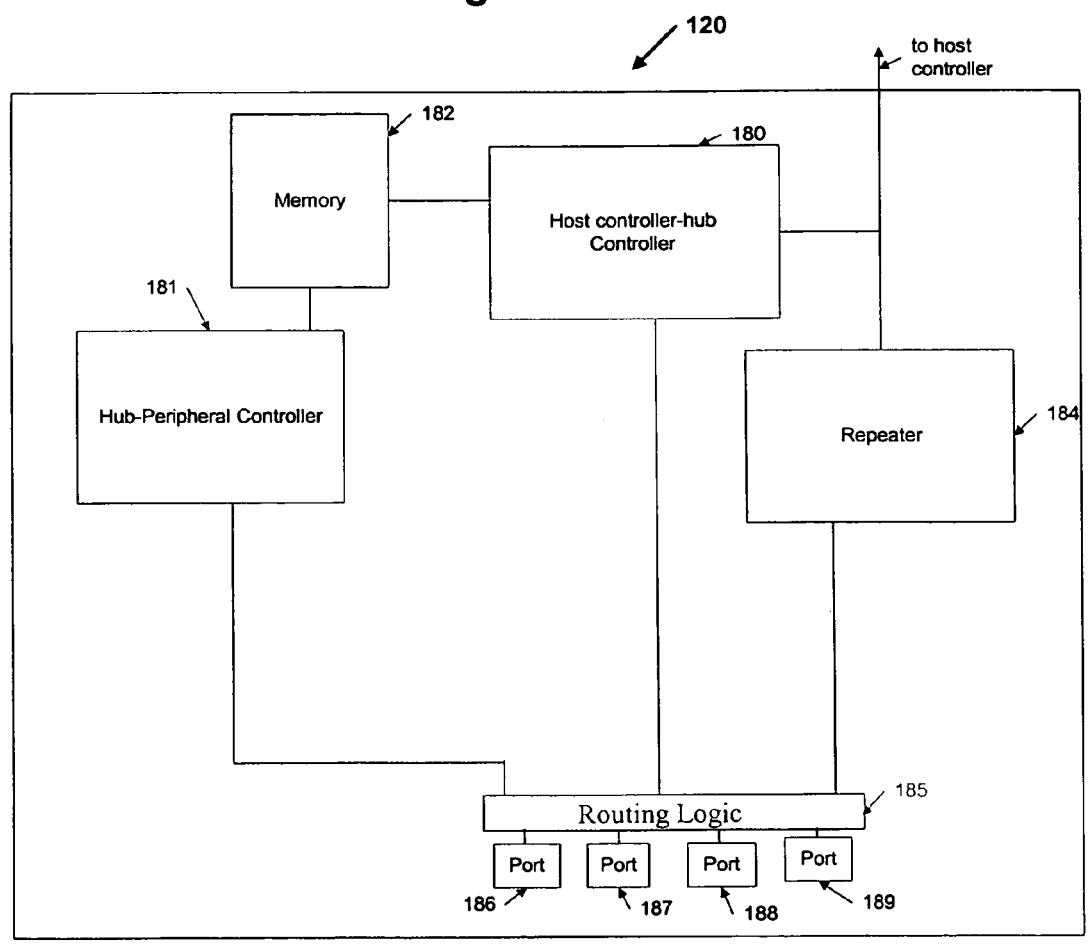
FIG. 8 illustrates in greater detail a hub for one embodiment in accordance with the present invention.

Tracking of repeat transactions in the hub will be described by referring to FIG. 8 which illustrates in greater detail hub 120 in an embodiment in accordance with the present invention. Hub 120 includes a host-controller-hub (or high-speed hub) controller 180, a hub-peripheral (or low-speed) hub controller 181, a memory 182, a repeater 184, a routing 185, and ports 186-189. In an embodiment in accordance with the present invention, before controller 110 and hub 120 engage in repeat transactions on behalf of peripheral 130, controller 110 and 180 engage in a transfer context setup transaction (or TC setup). In an embodiment in accordance with the present invention, for each legacy peripheral attached to hub 120, a TC setup is performed before host 110 attempts an advanced transaction with respect to the legacy peripheral. The TC setup synchronizes hub 120 to host 110 so that hub 120 can track repeat transactions being performed with respect to a particular peripheral.

Figure 9:
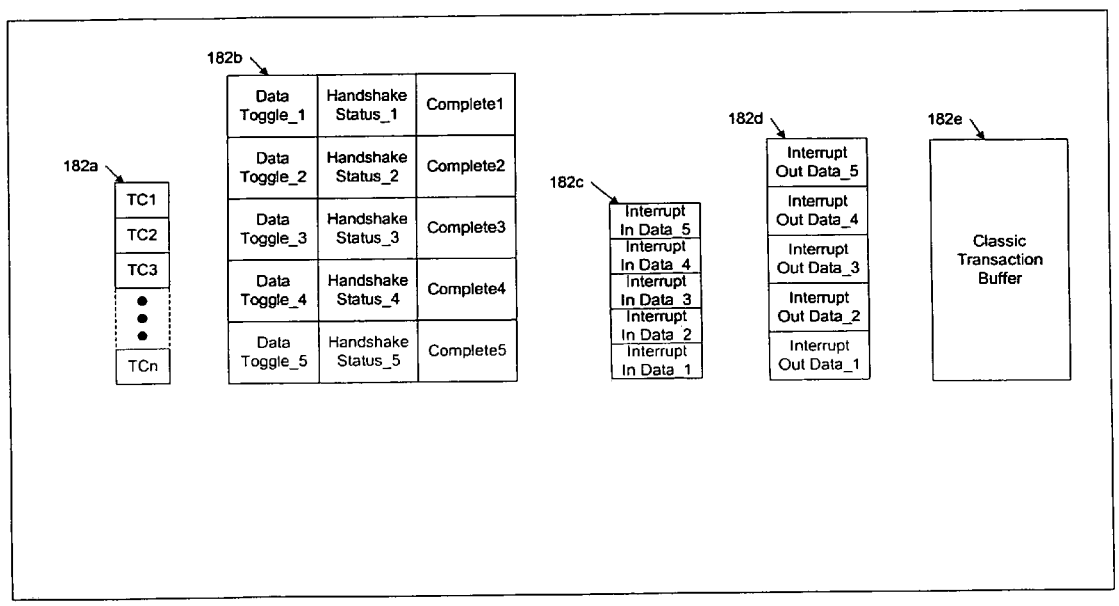
FIG. 9 which illustrates a memory including data structures used for repeat transaction tracking and processing for an embodiment in accordance with the present invention.

Synchronization of hub 120 will be described by referring to FIG. 9 which illustrates a memory including data structures used for repeat transaction tracking and processing for an embodiment in accordance with the present invention. Memory 182 includes transfer context array 182*a*, pending status array 182*b*, inbound data array 182*c*, outbound data array 182*d*, and classic transaction buffer 182*e*. Pending status array 182*b* is divided into five rows each of which has three elements: data toggle, handshake status indicator, and completion indicator. Each row is dedicated to storing information to be used in tracking repeat transactions with respect to a particular peripheral endpoint. During the TC setup for peripheral 130, controller 110 sends to controller 180 a pending array index, and a data toggle. The pending array index identifies the row in array 182*b* that will be used to store the data toggle. The data toggle allows controller 180 to keep track of classic transactions with respect to a particular peripheral endpoint. For a pending array index of 1, controller 180 stores the received data toggle in data toggle_1.

Classic transactions use a data toggle value of 0 to 1 to sequence correctly processed data OUT transactions. The controller 110 sends a data toggle value along with each data OUT transaction. When the peripheral correctly receives a data transaction it complements its data toggle and replies with a handshake. If the controller 110 receives the handshake correctly, it correspondingly complements its data toggle for use in the next data transaction for that peripheral endpoint. If the controller 110 or peripheral 130 doesn't correctly receive its part of the transaction, the controller data toggle value is not complemented and the controller 110 will retry the same data transaction. The peripheral 130 acknowledges a data transaction with the wrong data toggle value, but ignores the transaction and doesn't complement its data toggle value.

Hub 120 uses the behavior of the data toggle value and the status of the completion of the classic transaction to distinguish an advanced transaction from a repeated advanced transaction and a retried repeated advanced transaction. The data toggle stored initially in data toggle_1 has a value of 0, but other values are possible. Hub 120's completion indicator is also initially zero (false). The controller 110 will issue a corresponding data toggle value of 0 to indicate an advanced transaction. When the data toggle value that hub 120 has equals the data toggle the controller 110 sends in a data transaction and hub 120's array entry completion indicator is false, this indicates that the transaction received in connection with peripheral 130 is an advanced transaction. The initial completion indicator is zero to indicate that no classic transaction has been completed.

After the classic transaction has finished, the completion indicator is complemented. Then the next transaction issued by the controller 110 will be decoded as a repeat advanced transaction and the hub will respond with the results of the classic transaction. If the handshake was an ACK, the hub array entry data_toggle is complemented to prepare for the next new advanced transaction. In any case, the completion indicator is cleared to prepare for the next advanced transaction.

When hub 120 decodes a new advanced transaction, it replies with a NAK to indicate there is no current response from the peripheral 130. When hub 120 decodes a repeat advanced transaction or a retried repeat advanced transaction, it replies with the handshake results saved from the classic transaction.

TABLE 2

| Hub array entry Classic Complete? | Hub array entry data toggle = hub received transaction data toggle? | |
|---|---|---|
| | True | False |
| True | Repeat advanced transaction; reply with handshake status | Retried Repeat advanced transaction; reply with handshake status |
| False | New advanced transaction; hold and prepare for classic transaction; set/reply NAK handshake status | |

With regards to the data toggle activity for INs, there is no data toggle provided by the controller 110 for IN data transactions. Hub 120 still has a TC setup with an initial data toggle. However, this data toggle is used based on the data toggles received from the peripheral to determine the response to the controller 110. When hub 120 receives an IN from controller 110, it saves that information and issues a classic IN. When the peripheral responds with a matching data toggle, hub 120 ACKs and advances its data toggle and sets the completion indicator. When the controller 110 issues a repeat advanced transaction when the completion indicator is false, the hub responds with NAK. When the completion indicator is true, hub 120 responds with the classic data/handshake, but doesn't clear the completion indicator until it successfully receives the advanced transaction handshake.

The remaining elements in array 182b will now be described. Array 182b includes handshake status_1-handshake status_5, and complete1-complete5. Handshake status_1-handshake status_5 indicate the status of classic IN transactions performed between host controller 181 and legacy peripherals attached to hub 120. A handshake status indicates whether (1) the legacy peripheral properly received data during the classic transaction (ACK), (2) the legacy peripheral indicated that it is not able to operate normally (STALL), or (3) the legacy peripheral indicated that it wanted to be tried later (NAK). Complete 1-complete5 (or complete indication) indicate whether a classic transaction has not been performed, or whether it has been performed and the handshake information status is valid.

The remaining data structures in memory 182 will now be described. Array 182a is divided into transfer context (TC) elements TC1-TCn. During the TC setup for peripheral 130, controller 110 sends to controller 180 a TC index and access information for peripheral 130. The TC index indicates in which TC element the access information is to be stored. For purposes of illustration, the TC index for peripheral 130 is set to a value of 1, which means that controller 180 stores in TC1 the access information for peripheral 130. Access information includes: 1) the device and endpoint addresses for peripheral 130; and 2) the transfer type in which peripheral 130 engages. Controller 180 uses the access information to determine whether host 110 is trying to engage in repeat transactions with controller 180. If host 110 issues a transaction having a device and endpoint addresses equivalent to addresses in TC1-TCn, controller 180 decodes the transaction and determines what type of repeat transaction it is before reacting accordingly.

Outbound data array 182d includes elements out_data_1-out_data_5 each of which stores data which is received from controller 130 during an advanced transaction and is later forwarded to peripheral 130 during a classic transaction. Inbound data array 182c includes elements in_data_1-in_data_5 each of which stores data received from peripheral 130 during a classic transaction. Classic transaction buffer 182e includes elements (not shown) each of which stores a transaction record for a classic transaction to be performed with a legacy peripheral. A transaction record contains the device and endpoint addresses of a legacy peripheral, the transfer type to be performed with the legacy peripheral, a pointer to a data location in either array 182c or 182d, and a pending indicator. If the pending indicator is marked as pending, the transfer indicated in the transaction record is performed when its turn comes up. After the transfer is performed, the pending indicator is marked as completed. The length of buffer 182e is implementation dependent. The present invention is not limited to a buffer of a specific size but can have a buffer as large or as small as necessary to store transaction records for later performance. The method and apparatus for filling up the buffer with transaction records, marking a record as pending (i.e., needs to be performed), emptying the pipeline by performing the transactions represented by the transaction record, and marking a record as ready (i.e., performed), are well known in the art and need not be described here in order not to obscure the present invention.

Tracking of repeat transactions will now be described by referring to FIG. 10a that illustrates a flowchart of a process 200 for initializing state indicators in a hub in an embodiment in accordance with the present invention. Process 200 is part of the TC setup process at hub 120. When controller 180 engages in a TC setup for a legacy peripheral, at block 202 of process 200, the TC information received from hub 120 is saved in memory 182. At block 204, the data toggle that is received during the TC setup is assigned to the current transaction's data toggle in memory 182. At block 206, the current transaction's complete indicator is assigned a value of 0, indicating that the classic transaction has not been performed yet for the current transaction.

FIG. 10b which illustrates a process 210 for tracking transactions for an embodiment in accordance with the present invention. Tracking of repeat transactions will be described in the context of repeat transactions being performed with respect to legacy peripheral 130. At block 211, controller 180 determines which Nth array entry was assigned for the transaction that is being received at the hub. At decision block 212, controller 180 determines whether the transaction being performed by host 110 is a repeat advanced transaction that is being performed for at least the second time in a row by comparing the data toggle received with the transaction with the data toggle stored in the assigned Nth array entry. At decision block 214, controller 180 determines whether the transaction is an advanced transaction or a repeat advanced transaction by determining whether completeN indicates that the transaction has been performed or not. At block 216, controller 180 sets handshake status_N to NAK, stores a transaction record in classic transaction buffer 182e using information received during the advanced transaction, sends handshake status_N (NAK) to controller 110, and marks the stored transaction as pending. The transaction record specifies a transfer to be performed with peripheral 130. The transaction records are typically retrieved from buffer 182e by controller 181 for processing in a first-in-first-out manner.

After controller 181 performs classic transactions with peripheral 130, controller 181 updates the following state indicators: handshake_N and completeN. FIG. 10*c* illustrates a process 230 for updating state indicators for an embodiment in accordance with the present invention. At block 232, controller 181 sets handshake_N so that it indicates what occurred during the classic transaction: NAK, ACK, STALL, or timeout. At block 234, controller 181 sets completeN to indicate that the classic transaction has been attempted and has a valid transaction result.

Referring to FIG. 10*b*, at block 218, in response to a repeat advanced transaction controller 180 responds to host 110 with what happened during the classic transaction. Specifically, controller 180 sends handshake_N to host 110 so long as handshake_N is not equivalent to a timeout. If, however, handshake_N was set to timeout during the classic transaction, controller 180 does not respond causing host 110 to timeout. In an alternative embodiment, a handshake containing a timeout indication may be returned to host 110 instead of causing host 110 to timeout. After sending handshake_N or timing out as appropriate, if the handshake_N is an ACK, controller 180 complements data toggle_N. Controller 180 then sets completeN to indicate that the classic transaction has not been performed yet in preparation for the subsequent advanced transaction.

At block 220, having received a retried repeat advanced transactions, controller 180 sends handshake_N to host 110. Retried repeat advanced transactions may occur when the handshake that was sent during a prior repeat advanced transaction was not received by host 110. Since the handshake was not received, in an embodiment, host 110 repeats for a finite number of times the repeat advanced transaction before giving up.

Tracking of repeat transactions will now be described by referring to FIG. 10*d* that illustrates a flowchart of a process 240 for initializing state indicators in a hub for another embodiment in accordance with the present invention. Process 240 is similar to process 200 and need not be described in great detail here. The state indicators can be stored in a variety of data structures in memory 182. For the embodiment described by process 240, the state indicators are stored in an array having elements for the completion indicator and data toggle for the transactions being performed. Alternative embodiments in accordance with the present invention may have state indicators stored in other types of data structures.

Referring again to FIG. 8, operation of hub 120 during advanced transactions between host 110 and an advanced peripheral coupled to hub 120 will now be described. When host 110 starts an advanced transaction intended for an advanced peripheral, controller 180 recognizes that the advanced transaction is not intended for a legacy peripheral, but, rather, an advanced peripheral (e.g., peripheral 135) coupled to hub 120. In an embodiment, controller 180 enables repeater 184 to repeat signals received from (or destined to) host 110 during the advanced transaction and direct the repeated signal to routing logic 185. Routing logic 185, in turn, gives repeater 184 access to ports 186-189 to which advanced peripherals are coupled, allowing an advanced peripheral to receive the repeated signal. Similarly, routing logic 185, directs signals received from legacy and advanced peripherals to either repeater 184 or controller 180, depending on whether the signal is from an advanced peripheral or a legacy peripheral, respectively.

Thus, a method and apparatus for a host controller to communicate with a legacy peripheral via a hub using repeated identical transactions has been described. Additionally, a method and apparatus for scheduling the repeated identical transactions at a host controller and tracking the transactions at a hub has been described. Although the present invention has been described with reference to specific exemplary embodiments, it will be appreciated by one of ordinary skill in the art that various modifications and changes may be made to these embodiments without departing from the broader spirit and scope the invention as set forth in the claims. Accordingly, the specification and drawings are to be regarded in an illustrative rather than a restrictive sense.

What is claimed is:

1. A digital system comprising:

a host controller;

a device driver to operate the host controller to initiate and perform a first transaction at a first time between the host controller and a hub and to initiate and repeat the first transaction at a second time between the host controller and the hub;

wherein the hub is to perform a second transaction with an agent based upon the first transaction at the first time; and wherein the first transaction at the second time is repeated after the second transaction, and further wherein the host controller is to send, during the first transaction at the first time, a first packet including agent identification information and a transfer indicator indicating that data needs to be transferred between the host controller and the hub, and to transfer, during the first transaction at the first time, a data packet between the host controller and the hub.

2. The system of claim 1, wherein the host controller is to process, during the first transaction at the first time, at least one of an acknowledgment, a handshake indication, or a timeout indication.

3. The system of claim 1, wherein the data packet is transferred from the host controller to the hub.

4. A digital system comprising:

a host controller;

a device driver to operate the host controller to initiate and perform a first transaction at a first time between the host controller and a hub and to initiate and repeat the first transaction at a second time between the host controller and the hub;

wherein the hub is to perform a second transaction with an agent based upon the first transaction at the first time; and wherein the first transaction at the second time is repeated after the second transaction, and further wherein the host controller is to send to the hub, during the first transaction at the second time, a first packet including agent identification information and a transfer indicator indicating that data needs to be transferred between the hub and host controller, and to transfer, during the first transaction at the second time, a data packet between the host controller and the hub.

5. The system of claim 4, wherein the host controller is to process, during the first transaction at the second time, at least one of an acknowledgment, a handshake indication, or a timeout indication.

6. The system of claim 4, wherein the data packet is transferred from the hub to the host controller.

7. A digital system comprising:
- a first hub controller to initiate and perform a first transaction at a first time with a host controller and to initiate and perform the first transaction at a second time with the host controller;
- a second hub controller coupled to the first hub controller to perform a second transaction with an agent based upon the first transaction at the first time; and
- wherein the first transaction at the second time is performed after the second transaction, and wherein the first hub controller is to receive from the host controller a first packet including agent identification information, a transfer indicator indicating that data needs to be transferred between the host controller and the first hub controller, during the first transaction at the first time, and to transfer a data packet between the first hub controller and the host controller, during the first transaction at the first time.

8. The system of claim 7, wherein the first hub controller is to send to the host controller at least one of an acknowledgment or a handshake indication during the first transaction at the first time.

9. The system of claim 7, wherein the data packet is transferred from the host controller to the first hub controller.

10. A digital system comprising:
- a first hub controller to initiate and perform a first transaction at a first time with a host controller and to initiate and perform the first transaction at a second time with the host controller;
- a second hub controller coupled to the first hub controller to perform a second transaction with an agent based upon the first transaction at the first time; and
- wherein the first transaction at the second time is performed after the second transaction, and wherein the first hub controller is to receive from the host controller a first packet including agent identification information and a transfer indicator indicating that data needs to be transferred between the first hub controller and the host controller, during the first transaction at the second time, and to transfer a data packet between the first hub controller and the host controller during the first transaction at the second time.

11. The system of claim 10, wherein the first hub controller is to send to the host controller at least one of an acknowledgment or a handshake indication.

12. The system of claim 10, wherein the data packet is transferred from the host controller to the first hub controller.

* * * * *